(12) United States Patent
Takahashi

(10) Patent No.: US 11,029,898 B2
(45) Date of Patent: Jun. 8, 2021

(54) ELECTRONIC APPARATUS

(71) Applicant: KYOCERA Document Solutions Inc., Osaka (JP)

(72) Inventor: Minoru Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/650,818

(22) PCT Filed: Jun. 15, 2018

(86) PCT No.: PCT/JP2018/022820
§ 371 (c)(1),
(2) Date: Mar. 25, 2020

(87) PCT Pub. No.: WO2019/058663
PCT Pub. Date: Mar. 28, 2019

(65) Prior Publication Data
US 2020/0264816 A1    Aug. 20, 2020

(30) Foreign Application Priority Data

Sep. 25, 2017   (JP) .............................. JP2017-183909

(51) Int. Cl.
*G06F 3/12* (2006.01)
(52) U.S. Cl.
CPC ............ *G06F 3/1229* (2013.01); *G06F 3/121* (2013.01)
(58) Field of Classification Search
CPC ........ G06F 3/1229; G06F 3/121; G06F 13/00; H04N 1/00; B41J 29/38

USPC ....................................................... 358/1.15
See application file for complete search history.

(56) References Cited

U.S. PATENT DOCUMENTS

| 2002/0054313 A1 | 5/2002 | Shimizu | |
| 2013/0188221 A1* | 7/2013 | Ohno | ..................... G06F 3/1222 358/1.15 |
| 2013/0276017 A1* | 10/2013 | Walker | ............... H04N 21/6405 725/25 |

(Continued)

FOREIGN PATENT DOCUMENTS

| JP | 2002-123376 A | 4/2002 |
| JP | 2010-010825 A | 1/2010 |
| JP | 2014-059357 A | 4/2014 |

*Primary Examiner* — Miya J Williams
*Assistant Examiner* — Darryl V Dottin
(74) *Attorney, Agent, or Firm* — Hawaii Patent Services; Nathaniel K. Fedde; Kenton N. Fedde

(57) ABSTRACT

Load on a system is reduced.
In an embodiment, a status information managing unit acquires data indicating the status of each functional unit to be transmitted to an apparatus management server, and a system control unit instructs data acquisition timing for acquiring the data to the status information managing unit. Moreover, the status information managing unit acquires data that changes over time according to the usage status, and acquires and caches, in advance, data that does not change over time according to the usage status. Furthermore, after receiving a transmission request from the apparatus management server, the system control unit transmits status information including cached data and acquired data. Thus, at the time of data transmission, only data that changes over time need be acquired, so the number of data to be acquired may be reduced.

6 Claims, 7 Drawing Sheets

(56) References Cited

U.S. PATENT DOCUMENTS

2016/0099963 A1\* 4/2016 Mahaffey ............ H04L 63/0227
                                                    726/25

\* cited by examiner

FIG. 3

(DATA MANAGEMENT TABLE) 130

| ATTRIBUTE CODE | CHANGE CONDITION | DATA MANAGEMENT | ACQUIRED DATA ITEM | VALUE |
|---|---|---|---|---|
| 130a | 130b | 130c | 130d | 130e |
| A | NO CHANGE | ACQUIRE AND CACHE IN ADVANCE | SERIAL NUMBER | |
| B | CHANGES OVER TIME | ACQUIRE AT TRANSMISSION | IN-MACHINE TEMPERATURE | |
| C | CHANGES IN SPECIFIC PROCESSING | ACQUIRE AND CACHE IN ADVANCE, AND UPDATE IN SPECIFIC PROCESSING | PRINT COUNTER | |
| ⋮ | | | TRANSFER VOLTAGE | |

FIG.4A

(DATA MANAGEMENT TABLE: AT STARTUP) 130A

| ATTRIBUTE CODE | CHANGE CONDITION | DATA MANAGEMENT | ACQUIRED DATA ITEM | VALUE |
|---|---|---|---|---|
| A | NO CHANGE | ACQUIRE AND CACHE IN ADVANCE | SERIAL NUMBER | XYZ1234567 |
| B | CHANGES OVER TIME | ACQUIRE AT TRANSMISSION | IN-MACHINE TEMPERATURE | — |
| C | CHANGES IN SPECIFIC PROCESSING | ACQUIRE AND CACHE IN ADVANCE, AND UPDATE IN SPECIFIC PROCESSING | PRINT COUNTER | 100 SHEETS |
|   |   |   | TRANSFER VOLTAGE | 5 0 V |

130a  130b  130c  130d  130e (DATA MANAGEMENT TABLE: AT TIME OF EXECUTING SPECIFIC PROCESSING) 130B

| ATTRIBUTE CODE | CHANGE CONDITION | DATA MANAGEMENT | ACQUIRED DATA ITEM | VALUE |
|---|---|---|---|---|
| A | NO CHANGE | ACQUIRE AND CACHE IN ADVANCE | SERIAL NUMBER | XYZ1234567 |
| B | CHANGES OVER TIME | ACQUIRE AT TRANSMISSION | IN-MACHINE TEMPERATURE | — |
| C | CHANGES IN SPECIFIC PROCESSING | ACQUIRE AND CACHE IN ADVANCE, AND UPDATE IN SPECIFIC PROCESSING | PRINT COUNTER | 105 SHEETS |
| | | | TRANSFER VOLTAGE | 6 0 V |

(DATA MANAGEMENT TABLE: AT TIME OF DATA TRANSMISSION) 130C

| ATTRIBUTE CODE 130a | CHANGE CONDITION 130b | DATA MANAGEMENT 130c | ACQUIRED DATA ITEM 130d | VALUE 130e |
|---|---|---|---|---|
| A | NO CHANGE | ACQUIRE AND CACHE IN ADVANCE | SERIAL NUMBER | XYZ1234567 |
| B | CHANGES OVER TIME | ACQUIRE AT TRANSMISSION | IN-MACHINE TEMPERATURE | 20°C |
| C | CHANGES IN SPECIFIC PROCESSING | ACQUIRE AND CACHE IN ADVANCE, AND UPDATE IN SPECIFIC PROCESSING | PRINT COUNTER | 105 SHEETS |
| ⋮ | ⋮ | ⋮ | TRANSFER VOLTAGE | 60 V |

ELECTRONIC APPARATUS

TECHNICAL FIELD

The present invention relates to an electronic apparatus suitable for acquiring status information of the electronic apparatus.

BACKGROUND ART

An image forming apparatus such as a multifunction peripheral (MFP) such as a multifunction printer, a multifunction peripheral, or the like, for example, which is a kind of an electronic apparatus, may be maintained and managed by an apparatus management server connected via a network. In other words, on the apparatus management server side, various status information is periodically (for example once a day (for example, at 5:00 PM)) acquired from an image forming apparatus for maintenance management and the like.

Incidentally, the status information includes various information indicating the status of the apparatus, the usage status, the failure status, and the like. In addition, the status information includes a large amount of information that is updated according to the usage status of each functional unit that constitutes the image forming apparatus. Therefore, each functional unit has its own status information, and the information is managed according to the usage status. In addition, after receiving a transmission request from the apparatus management server side for transmitting status information, the image forming apparatus collects each of the status information, creates transmission data, and transmits the data to the apparatus management server.

In regard to transmission of such status information, Patent Literature 1 describes a printing system in which a printer controller acquires the operation status information of each image processing function, and centrally manages the acquired operation status information of each image processing function; and a host computer acquires and displays the most recent operation status information of each image processing function from the printer controller when transferring print data.

CITATION LIST

Patent Literature

Patent Literature 1: JP 2002-123376A

SUMMARY OF INVENTION

Problem to be Solved by the Invention

In the printing system of Patent Literature 1 described above, the printer controller centrally manages the operation status information of each image processing function, so even when there is a status information request from the host computer, the printer controller is able to transmit the centrally managed operation status information.

Incidentally, as described above, the status information managed by each functional unit includes a lot of information updated according to the usage status. Therefore, when the printer controller centrally manages the operation status information of each image processing function as in the printing system of Patent Literature 1, a load is imposed on the printer controller, and in some cases, there is a possibility that a communication failure will occur between the printer controller and each functional unit.

In this case, it is considered that in a case where the status information managed by each functional unit may be efficiently acquired, the load on the printer controller may be reduced. For this reason, development of an apparatus that is able to efficiently acquire status information managed by each functional unit is desired.

The present invention has been made in view of such a situation, and an object of the present invention is to provide an electronic apparatus capable of solving the problems described above.

Means for Solving the Problems

The electronic apparatus of the present invention includes: a status information managing unit that acquires and manages data indicating status of each functional unit for transmission to an apparatus management server; and a system control unit that instructs acquisition timing for acquiring the data to the status information managing unit; wherein the status information managing unit acquires first data that changes over time according to usage status at the time of data transmission to the apparatus management server; and acquires and caches in advance second data that does not change over time according to the usage status; and the system control unit, after receiving a transmission request from the apparatus management server, transmits status information including the first data acquired at the time of data transmission, and the second data that is cached by the status information managing unit.

Thus, at the time of data transmission, only data having a high degree of change need be acquired, so the number of data to be acquired may be reduced.

Effect of Invention

According to the electronic apparatus of the present invention, at the time of data transmission, the number of data to be acquired may be reduced, so the load on the system may be reduced.

BRIEF DESCRIPTION OF DRAWINGS

FIG. 3 is a diagram for describing the basic contents of a data management table that is managed by the MFP in FIG. 1.

FIG. 4A is a diagram illustrating a data management table that is managed by the MFP in FIG. 1, and illustrates the contents of the data management table at the time of startup.

FIG. 4B is a diagram illustrating a data management table that is managed by the MFP in FIG. 1, and illustrates the contents of the data management table when specific processing is executed.

FIG. 4C is a diagram illustrating a data management table that is managed by the MFP in FIG. 1, and illustrates the contents of the data management table at the time of data transmission.

MODES FOR CARRYING OUT THE INVENTION

Hereinafter, an embodiment of an electronic apparatus according to the present invention will be described with reference to FIG. 1 to FIG. 5. Note that in the following description, a multifunction peripheral (MFP) that is a complex peripheral apparatus equipped with various functional units such as a print function, a copy function, a FAX function, a data transmission/reception function via a network and the like will be used, for example, as an example of an electronic apparatus.

Figure 1:
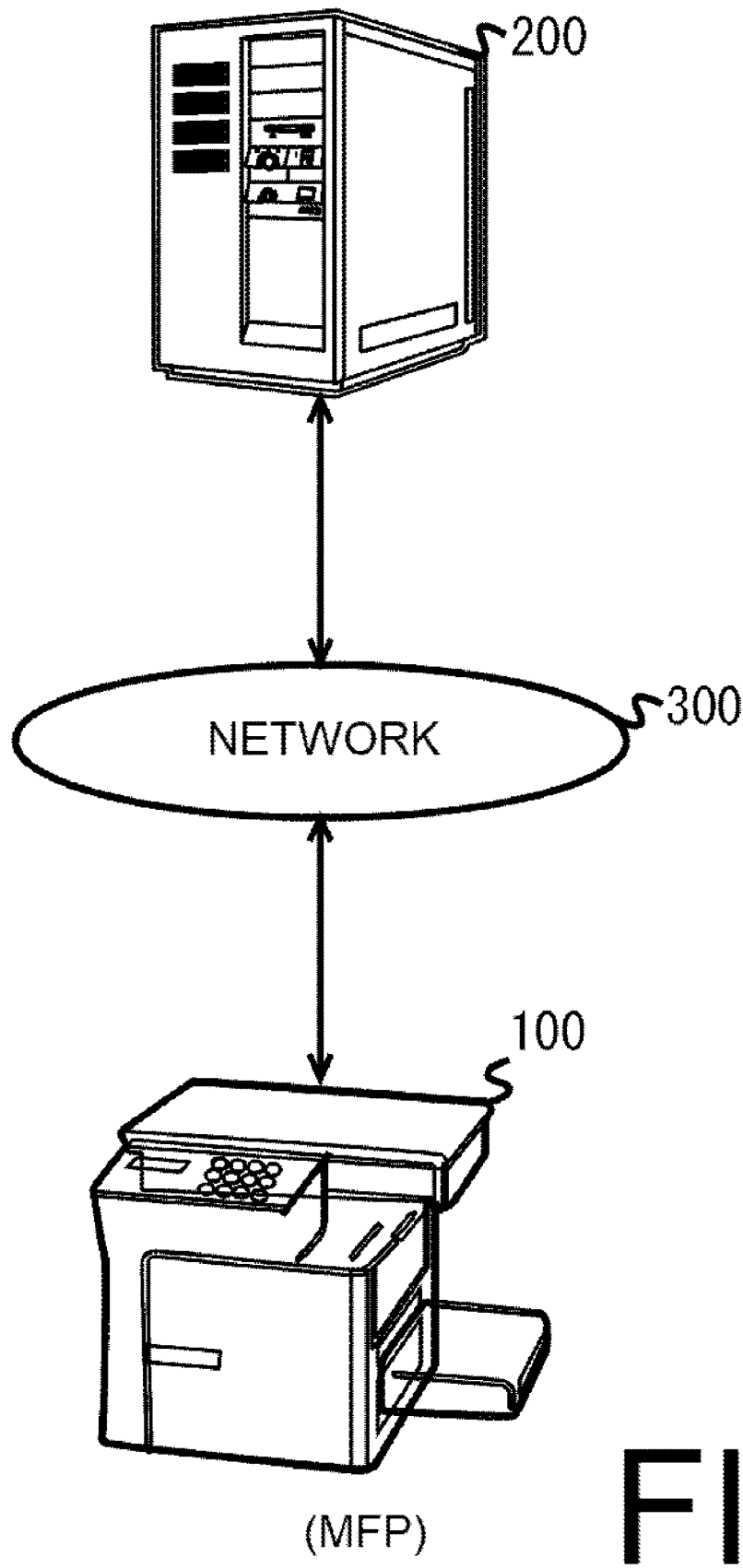
FIG. 1 is a diagram for describing an embodiment of an electronic apparatus according to the present invention.

First, as illustrated in FIG. 1, the MFP 100 is connected to an apparatus management server 200 via a network 300 such as the Internet or the like. Although the details will be described later, the MFP 100 manages status information of various functional units and the like, and transmits the status information in response to a request from the apparatus management server 200. It should be noted that the number of MFPs 100 is not limited to one, and may be two or more. The apparatus management server 200 periodically (for example, once a day (for example, 5:00 PM)) acquires various status information from the MFP 100 for maintenance management and the like of the MFP 100. Further, the timing of the request from the apparatus management server 200 may be arbitrarily changed. For example, it may be twice a day or once every two days. Also, the time is not limited to 5:00 PM but may be, for example, 8:00 AM or the like.

Figure 2:
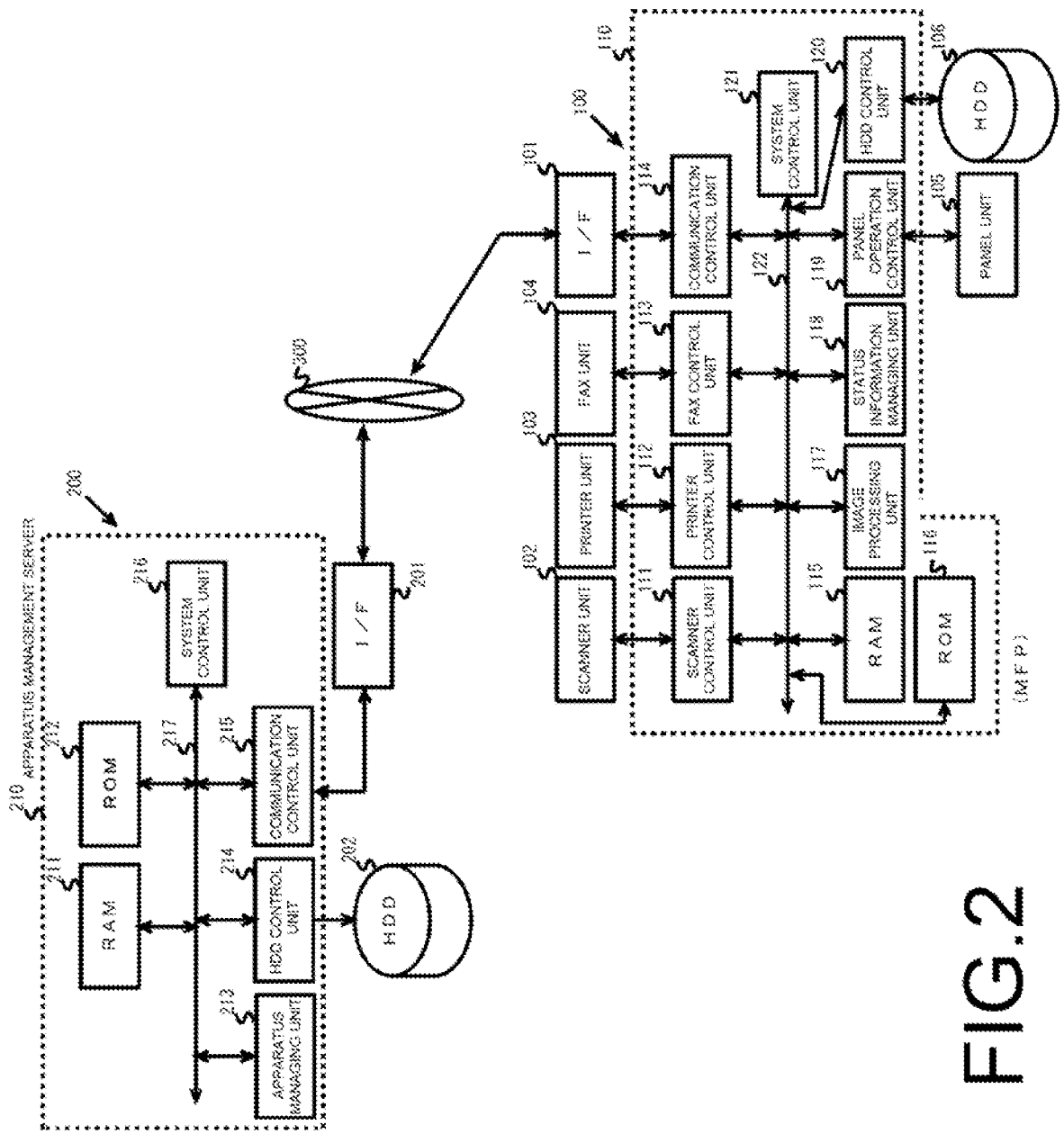
FIG. 2 is a diagram illustrating an example of a configuration of the MFP and the apparatus management server in FIG. 1.

Next, an example of a configuration of the MFP 100 and the apparatus management server 200 will be described with reference to FIG. 2. First, the MFP 100 includes a control unit 110 that controls operations of an I/F 101, a scanner unit 102, a printer unit 103, a FAX unit 104, a panel unit 105, and a hard disk drive (HDD) 106. The I/F 101 is responsible for communication with the apparatus management server 200 and the like via the network 300. In addition, the I/F 101 is responsible for communication with other MFPs 100, user terminals (not illustrated), and the like. Note that the I/F 101 may also be responsible for communication with a content server, a web server and the like (that are not illustrated) via the network 300. The scanner unit 102 is a device that converts an image of a document (not illustrated) that is read by an image sensor (omitted in the figures) into digital image data and inputs the digital image data to the control unit 110. The printer unit 103 is a device that prints an image on paper (not illustrated) based on print data that is outputted from the control unit 110. The FAX unit 104 is a device that transmits data that is outputted from the control unit 110 to a facsimile of another party via a telephone line, and receives data from the facsimile of another party and inputs the data to the control unit 110. The panel unit 105 is a device such as a touch panel or the like that performs a print function, a copy function, a FAX function, a data transmission/reception function via a network of the MFP 100, and performs displays for various settings of the MFP 100. The HDD 106 is a storage device that stores application programs and the like for providing various functions of the MFP 100. In addition, the HDD 106 has a user box for storing print jobs registered from a user terminal, for example.

The control unit 110 is a processor that controls the overall operation of the MFP 100 by executing an application program for a print function, a copy function, a facsimile function, a data transmission/reception function via a network and the like, an image forming program, a control program, and the like. The control unit 110 includes a scanner control unit 111, a printer control unit 112, a facsimile (FAX) control unit 113, a communication control unit 114, a random access memory (RAM) 115, a read-only memory (ROM) 116, an image processing unit 117, a status information managing unit 118, a panel operation control unit 119, an HDD control unit 120, and a system control unit 121. In addition, these units are connected to a data bus 122.

The scanner control unit 111 controls the reading operation of the scanner unit 102. The printer control unit 112 controls the printing operation of the printer unit 103. The FAX control unit 113 controls the data transmission/reception operation by the FAX unit 104. The communication control unit 114, via the I/F 101, controls transmission and reception of data and the like via the network 300.

The RAM 115 is a work memory for executing a program. In addition, the RAM 115 stores print data that has been subjected to image processing by the image processing unit 117. The ROM 116 stores a control program for performing an operation check or the like of each unit. The image processing unit 117 performs image processing (rasterization) on image data that is read by the scanner unit 102. In addition, the image processing unit 117 performs image processing (rasterization) on a print job registered in a user box of the HDD 106, for example. Note that the system control unit 121 causes the RAM 115 to temporarily store print data that has been subjected to image processing by the image processing unit 117.

The status information managing unit 118, as will be described in detail later, manages data indicating the status of each functional unit based on an instruction from the system control unit 121 and according to data management tables 130A to 130C illustrated in FIG. 4A to FIG. 4C described later. The panel operation control unit 119 controls the display operation of the panel unit 105. In addition, the panel operation control unit 119, via the panel unit 105, receives settings and the like for starting printing, copying, FAX, data transmission/reception via a network, and the like. The HDD control unit 120 controls reading, writing and the like of data to and from the HDD 106. The system control unit 121 controls the cooperative operation and the like of each unit. In addition, the system control unit 121 transmits status information that is managed by the status information managing unit 118 to the apparatus management server 200 via the communication control unit 114 in response to a periodic (for example, once a day (for example, 5:00 PM)) request from the apparatus management server 200.

The apparatus management server 200 includes an interface (I/F) 201 and a control unit 210 that controls the HDD 202. The I/F 201 is responsible for communication with the MFP 100 and the like via the network 300. The HDD 202 stores an application program for providing various functions of the apparatus management server 200, status information acquired from the MFP 100, and the like.

The control unit 210 is a processor that controls the overall operation of the apparatus management server 200 by executing an application program, a control program, and the like. The control unit 210 includes a RAM 211, a ROM 212, an apparatus managing unit 213, an HDD control unit 214, a communication control unit 215, and a system control unit 216. In addition, these units are connected to a data bus 217. The RAM 211 is a work memory for executing a program. The ROM 212 stores a control program for performing an operation check or the like of each unit. The apparatus managing unit 213 manages the status information that is acquired from the MFP 100 in association with the apparatus identification information. Note that the status information is stored in the HDD 202. The HDD control unit 214 controls reading, writing and the like of data to and from the HDD 202. The communication control unit 215, via the I/F 201, controls transmission and reception of data and the like via the network 300. System control unit 216 periodically (for example, once a day (for example, 5:00 PM)) acquires status information from the MFP 100.

Next, a basic configuration of the data management tables 130A to 130C in FIG. 4A to FIG. 4C managed by the status information managing unit 118 will be described with reference to FIG. 3. The data management tables 130A to 130C will be described later. In other words, the data management table 130 in FIG. 3 includes an item column 130a indicating an attribute code, an item column 130b indicating change conditions, an item column 130c indicating data management, an item column 130d indicating acquired data items, and an item column 130e indicating acquired values.

The attribute codes in the item column 130a are indicated, for example, by A to C. The attribute code B is data (first data) that changes over time according to the usage status. The attribute codes A and C are data (second data) that do not change over time according to the usage status, and are data of a property having a lower degree of change compared with data (first data) corresponding to attribute code B. The change conditions in item column 130b are classified into three change states, for example, "no change", "changes over time", and "changes in specific processing". In other words, attribute code A indicates data (third data) having the property of "no change". Moreover, attribute code B indicates data (first data) having the property of "changes over time". Furthermore, the attribute code C indicates data (fourth data) having a property of "changes in specific processing".

The data management in the item column 130c defines three management methods: "acquire and cache in advance", "acquire at transmission", and "acquire and cache in advance, and update in specific processing". In other words, the data of the attribute code A having the "no change" property is "acquire and cache in advance". Moreover, the data of the attribute code B having the property "changes over time" is "acquire at transmission". Furthermore, the data of the attribute code C having the property "changes in specific processing" is "acquire and cache in advance, and update in specific processing".

The acquired data items in item column 130d indicate "serial number", "in-machine temperature", "print counter", "transfer voltage", and the like. The "serial number" or the like corresponds to data having the property "no change" of attribute code A. In addition, the "in-machine temperature" or the like corresponds to data having the property "changes over time" of attribute code B. Moreover, the "print counter", "transfer voltage", and the like corresponds to data having the property "changes in specific processing" of attribute code C. Note that the example of the acquired data item 130d is merely an example, and represents a typical example. Furthermore, the values in the item column 130e indicate the acquired data. In addition, the data included in the attribute codes A to C is stored in a nonvolatile storage device such as the HDD 106 or the like. Note that the data included in the attribute code B may be stored in a volatile storage device such as the RAM 115 or the like.

Next, an example of the data management tables 130A to 130C managed by the status information managing unit 118 will be described with reference to FIG. 4A to FIG. 4C. First, FIG. 4A illustrates the data management table 130A at the time of startup of the MFP 100. Here, the time of startup is, for example, when the MFP 100 is in the power OFF mode and switches from the power OFF mode to the normal mode. Moreover, the time of startup may be when the power supply of the MFP 100 is in the OFF state (the main switch is "OFF") and a startup process is being executed to switch the power supply to the ON state (the main switch is "ON"). At the time of startup, the status information managing unit 118 registers the data "serial number", "print counter", and "transfer voltage" illustrated in the item column 130d in the data management table 130A illustrated in FIG. 4A. In other words, the status information managing unit 118 acquires data corresponding to the attribute codes A and C at the time of startup, and stores the data in the HDD 106. In addition, the status information managing unit 118 stores data indicating the "serial number" xyz1234567, the data indicating "print counter" 100 sheets, and the data indicating "transfer voltage" 50 V in the item column 130e in the HDD 106, and at the same time, registers each of the data in the item column 130e of the data management table 130A. Note that the "transfer voltage" may be acquired as a set value at the time of startup of the MFP 100.

Next, FIG. 4B illustrates the data management table 130B at the time of executing specific processing. Here, the specific processing is processing such as a print function, a copy function, a FAX function, and a data transmission/reception function via a network and the like. At the time of executing specific processing, the status information managing unit 118 updates the data of the "print counter" and "transfer voltage" of the data of the "serial number", "in-machine temperature", "print counter", and "transfer voltage" in the item column 130d of the data management table 130B illustrated in FIG. 4B. In other words, at the time of executing a printing process, for example, the status information managing unit 118 acquires the data of the "print counter" and the data of the "transfer voltage", updates the data of the "print counter" and the data of the "transfer voltage" that are stored in the HDD 106, and at the same time, updates the data in the item column 130e of the data management table 130A. Here, for example, when the print function, the copy function, or the FAX function is used as the specific processing, the value of the "print counter" changes according to the printing process, so that the data of the "print counter" is updated according to the change. Note that in the case of the "transfer voltage", it is illustrated that the data of the "transfer voltage" is changed in accordance with a setting change or the like via the panel unit 105.

Next, FIG. 4C illustrates the data management table 130C at the time of data transmission. Here, the time of data transmission is a period until the MFP 100 transmits status information in response to a status information transmission request from the apparatus management server 200. At the time of data transmission, the status information managing unit 118 acquires and registers the data of the "in-machine temperature" of the data of the "serial number", "in-machine temperature", "print counter", and "transfer voltage" data illustrated in the item column 130d of the data management table 130C illustrated in FIG. 4C. In other words, the status information managing unit 118 registers the "in-machine temperature" as 20° C. as illustrated in the item column 130e.

Then, after receiving a status information request from the apparatus management server 200, the system control unit 121 of the MFP 100 creates transmission data based on the data management table 130C at the time of data transmission managed by the status information managing unit 118 and transmits the transmission data to the apparatus management server 200.

In addition, the data management definitions illustrated in the item column 130c of FIG. 4A to FIG. 4C may be arbitrarily changed. Furthermore, the contents of the acquired data items illustrated in the item column 130*d* of FIGS. 4A to 4C may be also arbitrarily changed.

Figure 5:
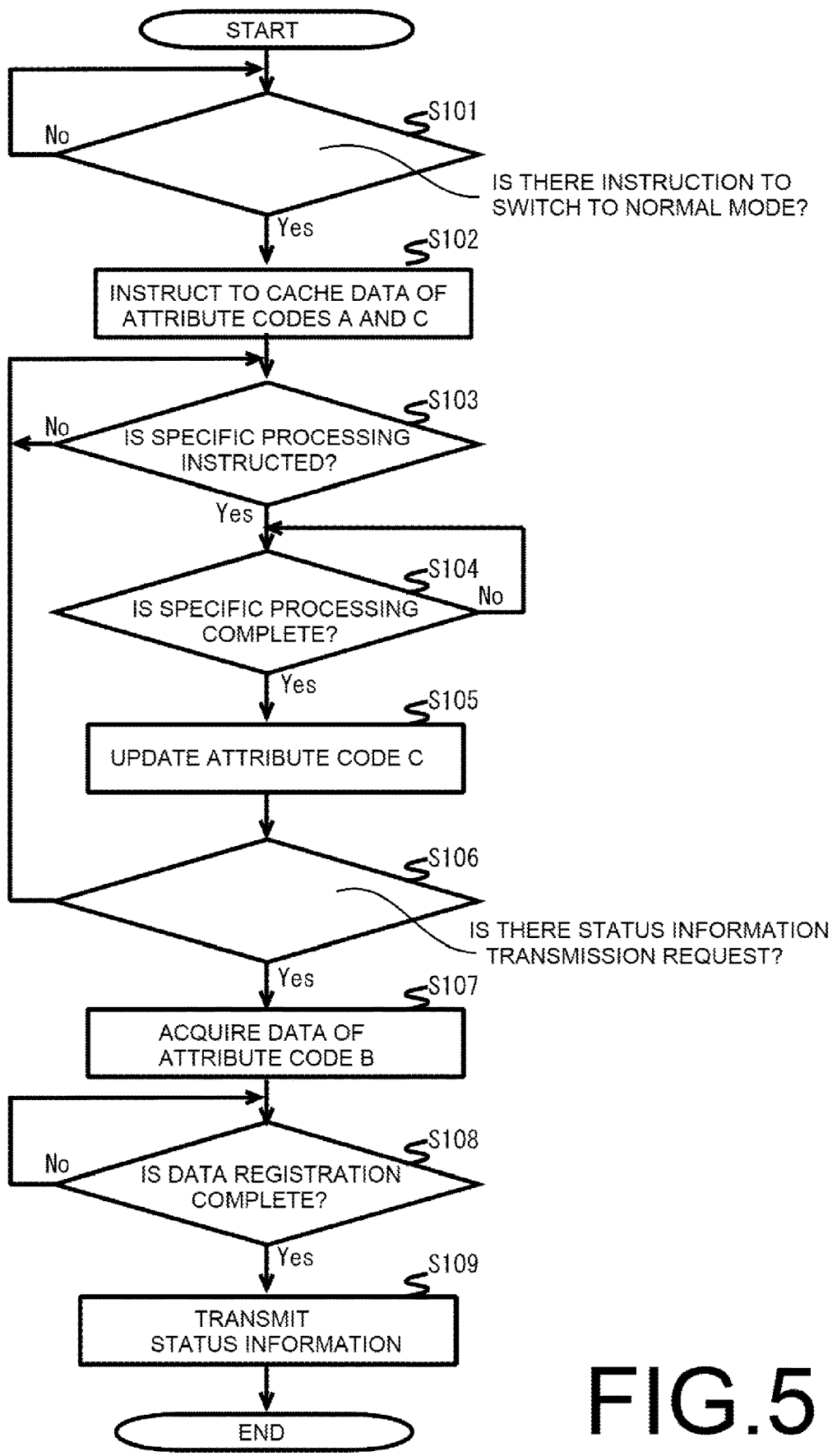
FIG. 5 is a flowchart for describing a process related to data acquisition by the MFP in FIG. 1.

Next, processing related to data acquisition by the MFP 100 will be described with reference to FIG. 5. Note that in the following, it is presumed that data corresponding to the attribute codes A and C illustrated in FIG. 4A to FIG. 4C are cached in the HDD 106. Moreover, in the following, it is presumed that the MFP 100 has switched to the power OFF mode. Furthermore, in the following, specific processing is presumed to be printing.

(Step S101)

The system control unit 121 determines whether or not there is an instruction to switch to the normal mode.

In this case, the system control unit 121 determines that there is no instruction to shift to the normal mode unless there is a notification from the panel operation control unit 119 via the panel unit 105 that there is an instruction to shift to the normal mode (step S101: NO).

On the other hand, when there is a notification from the panel operation control unit 119 via the panel unit 105 indicating that there is an instruction to shift to the normal mode, the system control unit 121 determines there is an instruction to shift to the normal mode (step S101: YES), and proceeds to step S102.

(Step S102)

The system control unit 121 instructs the status information managing unit 118 to cache the data of the attribute codes A and C.

At this time, the status information managing unit 118, at the time of startup, acquires data corresponding to the attribute codes A and C in the data management table 130A, and stores the data in the HDD 106. In other words, the status information managing unit 118 acquires data indicating "serial number" xyz1234567 corresponding to the attribute code A in the item column 130*e* and stores the data in the HDD 106. In addition, the status information managing unit 118 causes the HDD 106 to store data indicating the "print counter" 100 sheets and data indicating the "transfer voltage" 50 V corresponding to the attribute code C in the item column 130*e*. Moreover, the status information managing unit 118 stores the data corresponding to the attribute codes A and C in the HDD 106, and at the same time registers the respective data in the item column 130*e* of the data management table 130A.

(Step S103)

The system control unit 121 determines whether or not specific processing has been instructed.

In this case, the system control unit 121 determines that specific processing is not instructed unless there is a notification from the panel operation control unit 119 via the panel unit 105 indicating that there is a print instruction (step S103: NO).

On the other hand, the system control unit 121 determines that specific processing is instructed when there is a notification from the panel operation control unit 119 via the panel unit 105 indicating that there is a print instruction (step S103: YES), and proceeds to step S104.

(Step S104)

The system control unit 121 determines whether or not the specific processing has been completed.

In this case, the system control unit 121 determines that the specific processing has not been completed unless there is a notification from the printer control unit 112 indicating the end of printing (step S104: NO).

On the other hand, when there is a notification from the printer control unit 112 indicating the end of printing, the system control unit 121 determines that the specific processing is completed (step S104: YES), and proceeds to step S105.

(Step S105)

The system control unit 121 causes the status information managing unit 118 to update the data of the attribute code C.

At this time, at the time of executing specific processing, the status information managing unit 118, as illustrated in FIG. 4B, acquires data of the "print counter" and the "transfer voltage" corresponding to attribute code C of the data of the "serial number", "in-machine temperature", "print counter", and "transfer voltage" illustrated in item column 130*d* of the data management table 130B, and updates the data in the HDD 106, while at the same time, updates the data corresponding to item column 130*d*. In other words, the status information managing unit 118 updates the data of the "print counter" to, for example, 105 sheets, and updates the data of the "transfer voltage" to 60 V, as illustrated in the item column 130*e*.

(Step S106)

The system control unit 121 determines whether or not there is a status information transmission request from the apparatus management server 200.

In this case, the system control unit 121 determines that there is no status information transmission request from the apparatus management server 200 unless there is a notification from the communication control unit 114 indicating that there is a status information transmission request from the apparatus management server 200 (step S106: NO).

On the other hand, when there is a notification from the communication control unit 114 indicating that there is a status information transmission request from the apparatus management server 200, the system control unit 121 determines that there is a status information transmission request from the apparatus management server 200 (step S106: YES), and proceeds to step S107).

(Step S107)

The system control unit 121 causes the status information managing unit 118 to acquire the data of the attribute code B.

At this time, at the time of data transmission, as illustrated in FIG. 4C, the status information managing unit 118 acquires and registers the data of the "in-machine temperature" of the data of the "serial number", "in-machine temperature", "print counter", and "transfer voltage" illustrated in the item column 130*d* of the data management table 130C. In other words, the status information managing unit 118 acquires the data of "in-machine temperature" and registers the "in-machine temperature" illustrated in the item column 130*e* as 20° C.

(Step S108)

The system control unit 121 determines whether or not data registration by the status information managing unit 118 is completed.

In this case, the system control unit 121 determines that data registration has not been completed unless there is a notification from the status information managing unit 118 indicating that data registration has been completed for the data management table 130C (step S108: NO).

On the other hand, the system control unit 121 determines that the data registration has been completed when there is a notification from the status information managing unit 118 indicating that data registration has been completed for the data management table 130C (step S108: YES), and proceeds to step S109.

(Step S109)

The system control unit 121 transmits the status information to the apparatus management server 200.

In this case, the system control unit 121 creates data indicating status information for transmission based on the data management table 130C at the time of data transmission managed by the status information managing unit 118, and transmits the data to the apparatus management server 200.

In addition, in step S105, it is possible to predict that the degree of change is high for data relating to a function having a high execution frequency of the specific processing. Therefore, for data relating to a function having an execution frequency of the specific processing that is equal to or greater than a threshold value (for example, one time per minute), the cache in the HDD 106 may be omitted, and the data may be acquired at the time of data transmission as in the case of data corresponding to the attribute code B. In particular, for data related to a function that repeatedly executes processing in a short time, it is preferable to acquire data at the time of data transmission in order to avoid repeated updates.

Moreover, at the time of startup in step S102, the status information managing unit 118 acquires data corresponding to the attribute codes A and C of the data management table 130A; however, the data acquisition timing in this case may be set arbitrarily. In other words, at the time of startup, data corresponding to the attribute codes A and C may be divided and sequentially acquired. Furthermore, for example, it is possible to wait a specific amount of time (for example, 10 seconds) after the startup processing is complete, and after that specific amount of time has elapsed, data corresponding to the attribute codes A and C may be acquired collectively or dividedly. As a result, it is possible to reduce the load caused by the startup process and the data acquisition process.

As described above, in the present embodiment, the status information managing unit 118 acquires data indicating the status of each functional unit to be transmitted to the apparatus management server 200, and the system control unit 121 instructs the data acquisition timing to the status information managing unit 118. Moreover, the status information managing unit 118 acquires the data of the attribute code B (data that changes over time according to the usage status) at the time of data transmission to the apparatus management server 200, and acquires and caches the data of the attribute codes A and C (the data that does not change over time according to the usage status) in advance. Furthermore, after receiving a transmission request from the apparatus management server 200, the system control unit 121 transmits status information including data cached by the status information managing unit 118 and data acquired at the time of data transmission.

Thus, at the time of data transmission, only the data of the attribute code B (data that changes over time) needs to be acquired, so that the number of data to be acquired may be reduced, and the load on the system may be reduced.

Note that in the present embodiment, the electronic apparatus is an MFP 100, however the present invention may also be applied to other image forming apparatuses such as a multifunction printer or the like.

The invention claimed is:

1. An electronic apparatus, comprising:
a status information managing unit that acquires data indicating status information of each functional unit and manages the status information according to a data management table;
a system control unit that instructs acquisition timing for acquiring the data to the status information managing unit and creates transmission data, based on the acquired data, for transmission by the system control unit to an apparatus management server; and
a storage device; wherein
the status information is classified into first data that changes over time according to usage status, and second data that does not change over time according to the usage status,
the second data is third data having a property that does not change and fourth data having a property that changes in specific processing, and
the system control unit, at each of a time of startup, a time of executing specific processing, and the time of transmission of the transmission data, instructs data acquisition timing for acquiring the data to the status information managing unit;
the status information managing unit
at the time of the startup, registers the third data and the fourth data in the data management table;
at the time of executing specific processing, acquires the fourth data and updates the registered fourth data in the data management table; and
acquires the first data at the time of transmission of the transmission data to the apparatus management server and registers the first data in the data management table; and
the system control unit, after receiving a transmission request from the apparatus management server, based on the data management table, creates the transmission data indicating status information including the first data, the third data, and the fourth data that are managed at the time of transmission of the transmission data, and transmits the created transmission data to the apparatus management server.

2. The electronic apparatus according to claim 1, wherein: when an execution frequency of specific processing of the fourth data is equal to or greater than a threshold value, registration of the fourth data in the data management table at the time of the specific processing of the fourth data is omitted, and the fourth data is acquired at the time of transmission of the transmission data.

3. The electronic apparatus according to claim 1, wherein: the first data includes an in-machine temperature of the electronic apparatus.

4. The electronic apparatus according to claim 1, wherein: the third data includes a serial number of the electronic apparatus.

5. The electronic apparatus according to claim 1, wherein: the fourth data includes transfer voltage.

6. The electronic apparatus according to claim 1, wherein: the electronic apparatus is an image forming device, and the fourth data includes a print counter.

* * * * *